Figure 1:
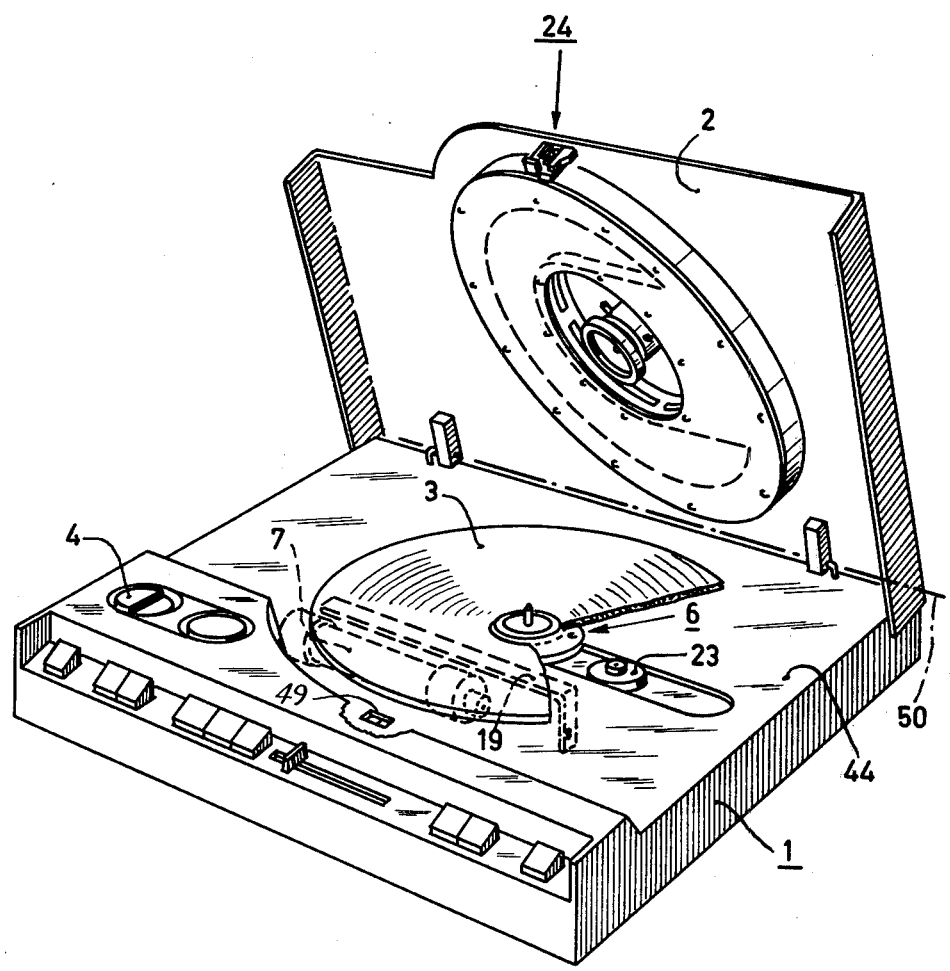

United States Patent [19]

Camerik

[11] 4,135,721
[45] Jan. 23, 1979

[54] VIDEO DISC PLAYER

[75] Inventor: Eduard Camerik, Eindhoven, Netherlands

[73] Assignee: U.S. Philips Corporation, New York, N.Y.

[21] Appl. No.: 783,840

[22] Filed: Apr. 1, 1977

[30] Foreign Application Priority Data

Feb. 10, 1977 [NL] Netherlands ........................ 7701383

[51] Int. Cl.² .......................... G11B 1/00; G11B 17/00
[52] U.S. Cl. ............................ 274/1 D; 179/100.3 V; 274/2; 358/128
[58] Field of Search .......................... 274/1 R, 1 D, 2; 358/128; 179/100.3 V

[56] References Cited

U.S. PATENT DOCUMENTS

| 3,930,653 | 1/1976 | Huff | 274/2 |
| 3,954,272 | 5/1976 | Leedom | 358/128 |
| 4,032,971 | 6/1977 | Camerik | 179/100.3 V |

Primary Examiner—Steven L. Stephan
Attorney, Agent, or Firm—Thomas A. Briody; Jack Oisher; Simon L. Cohen

[57] ABSTRACT

The spindle motor of a video disc player is simultaneously disengaged from the motor power source and connected to an electromagnetic safety device for maintaining the cover of the player in a safety position by virtue of the induction current generated by the freely spinning motor until the motor speed is reduced to a safe angular velocity. An electromagnetically operated brake powered by the inductive current generated by the motor assists in reducing the motor velocity.

3 Claims, 6 Drawing Figures

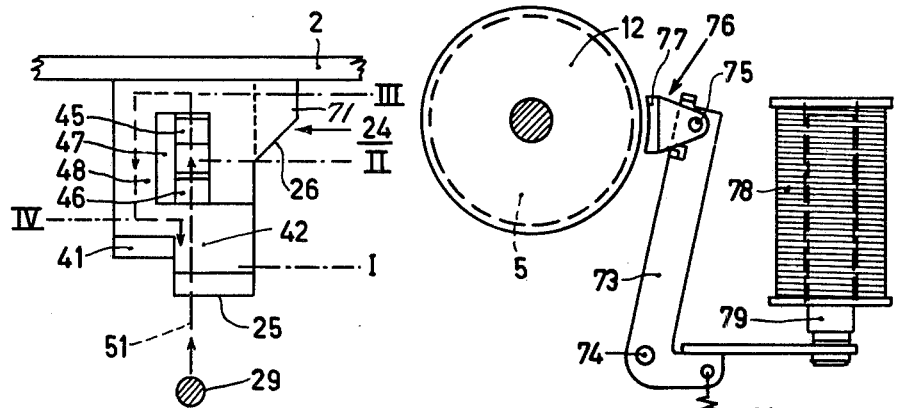
Fig. 3
Fig. 4
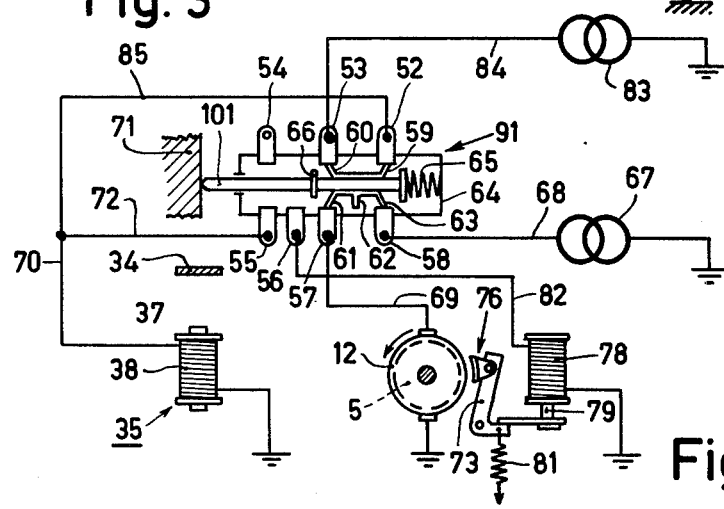
Fig. 5
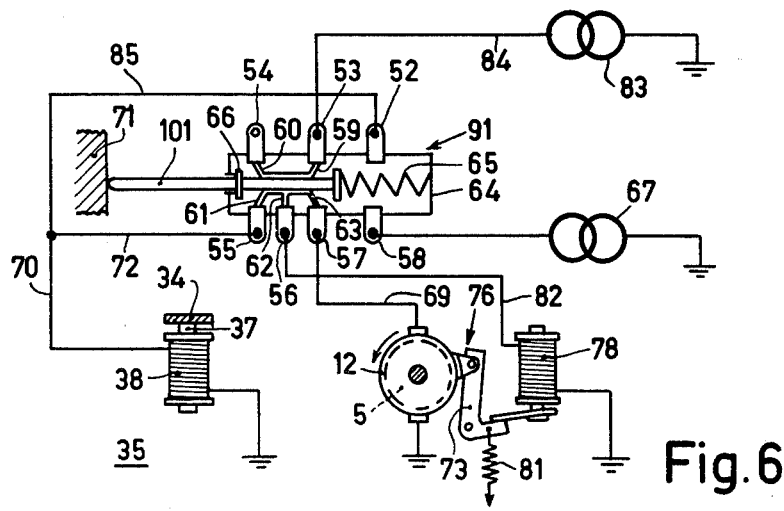
Fig. 6

VIDEO DISC PLAYER

The invention relates to a video disc player for playing back optically readable video discs. A player of this type is enclosed in a housing provided with a recess. A cover mounted on the housing is movable about a pivoting axis between a fully opened position and a fully closed playing position so that a video disc that is being played may be covered. The cover may be latched in its playing position, using a spring-loaded movably journalled catch and a cam body which is secured to a side of the cover opposite the pivoting axis. The cam body in the playing position extends into the recess in the housing and is provided with a latching cam which co-operates with the catch in the playing position of the cover, and with a safety cam. An unlatching means is provided for releasing the cover from its latched position into an unlatched position. The unlatching means comprises a manual actuating member, an unlatching member which is movable between an initial position and an unlatching position by means of the manual actuating member, on which unlatching member the catch is journalled, as well as unlatching spring means for resiliently urging the cover from its playing position towards its unlatched position. The unlatching member is moved from its initial position to its unlatching position by actuation of the manual actuating member, so that the catch is moved relative to the cam body from the latching cam into a position in which the cover, without being impeded by the latching cam, can be opened by the unlatching spring means into a safety position which is situated between the latched position and the unlatched position. In the safety position the safety cam of the cam support is pressed against the catch by unlatching spring means, and owing to the unlatching member returns from its unlatching position to its initial position. The catch is moved relative to the cam body into a position in which the cover, without being impeded by the safety cam, can be opened further to its unlatched position by the unlatching spring means. The player is further provided with main motor; a drive spindle driven by the main motor for rotating a video disc; a main motor supply circuit comprising an electric supply source for powering the main motor and a main motor switch for switching on and switching off the supply of electric supply current to the main motor with the aid of the cam body. Switching on is effected by a movement of the cover from its unlatched position to its playing position and switching off is effected by a movement of the cover from its playing position to its safety position. Braking means which co-operates with the main motor and with the cover for braking the rotary movement of the drive spindle after the cover has been released from its playing position into its safety position and a safety mechanism which prevents the unlatching member from returning from its unlatching position to its initial position for a certain time interval which suffices to allow the braking means to reduce the speed of rotation of the drive spindle to a non-hazardous safe value are also provided.

Such a video record player has been described previously in the Applicant's U.S. Pat. No. 4,032,971, issued June 28, 1977. In this previously described video disc player the braking means directly cooperates with the cam body and comprises a pivotable brake lever with which a brake band can be pulled onto or released from a brake disc which is mounted on the drive spindle. When the cover is closed the brake lever is maintained in such a position by the cam body that the brake band remains in its disengaged position. After the cover has been unlatched the cam body no longer cooperates with the brake lever. The main motor is now braked automatically in that a spring rotates the brake lever so that the brake band comes into engagement with the brake disc and the main motor is braked together with the drive spindle and the video disc on said spindle. The safety mechanism comprises a retardation mechanism. With the aid of an oil or grease-filled damper the unlatching member is slowly returned to its initial position by means of a tension spring, after the unlatching member has been brought into its unlatching position and after the manual actuating member has been released by an operator. The speed with which this happens has been selected so that there is sufficient time to stop the main motor completely. At the instant that the unlatching member has nearly reached its initial position the catch runs off the safety cam and the cover is moved into its unlatched position by means of the previously mentioned resilient means provided for this purpose. After this the cover can be opened completely.

A hazardous situation might arise if either the automatic braking means or the retardation mechanism fails to function correctly. The retardation mechanism is essentially suitable for measuring a specific time interval, but this is effected independently of whether or not the main motor is braked. Further, in the event of an inadequate damping action of the oil or grease damper the unlatching member may move too rapidly from its unlatching position to its initial position, so that even with correct braking the cover may already unlatched before the speed of rotation of the main motor has been braked down to a safe value.

It is an object of the invention to provide a video disc player of the type mentioned in the preamble which is provided with a safety mechanism which only allows a complete unlatching of the cover when the speed of rotation of the main motor has actually decreased to a non-hazardous safe value, independently of the time interval required for this. The invention is characterized in that the safety mechanism comprises: electromagnetic safety means which co-operate with the unlatching member, comprising an electric safety magnet and a safety armature which is movable relative thereto. An electric safety circuit comprising electric conductors and a safety switch co-operates with the cover, by means of which the safety magnet is connected to the main motor when the cover is in its safety position, in order to feed an induction current generated by the main motor to the safety magnet for magnetically attracting the safety armature after the cover has been released from its playing position into its safety position while the main motor still rotates. This prevents the unlatching member from returning from its unlatching position to its initial position until the speed of rotation of the drive spindle has decreased to at the most the said safe value.

In the video disc player in accordance with the invention it is thus impossible that the unlatching member is returned from its unlatching position to its initial position before the main motor has practically stopped. In practice it is found to be quite well possible to adapt the safety magnet, the safety armature and a spring for withdrawing the unlatching member to each other and to proportion them in such a way that the safety armature is withdrawn from the safety magnet by the spring when the main motor has reached a speed which is of the order of 100 revolutions per minute. During braking the safety magnet which may consist of a coil with a metal core presents a load to the main motor and thus also has a certain braking effect on the main motor. It is even possible to brake the main motor entirely with the aid of electrical means by for example dimensioning the safety magnet in a suitable manner and, as the case may be, including other circuit elements forming a load in the safety circuit.

An embodiment of the invention concerns video disc players in which the braking means comprises: a rotatable brake disc which is connected to the main motor; a braking force transmission member which is movably mounted in the housing; as well as a brake member which is connected to the braking force transmission member. The brake member is movable relative to the brake disc between a braking position in which it frictionally co-operates with the brake disc and a disengaged position in which it leaves the brake disc completely free. The embodiment is characterized in that the braking means furthermore comprise: a stationary electromagnetic brake magnet; a brake armature which is electromagnetically movable by the brake magnet and is connected to the force transmission member; resilient means for continuously resiliently urging the braking force transmission member in a direction opposite to the movement of the brake member from its disengaged position to its braking position; as well as an electric brake circuit. The brake circuit comprises a brake switch which co-operates with the cover, by means of which switch the brake magnet is connected to the main motor when the cover is in its safety position, in order to feed, an induction current generated by the main motor to the brake magnet for magnetically attracting the brake armature after the cover has been released from its playing position into its safety position while the main motor still rotates and thus by means of the brake member brake the drive spindle until its speed of rotation has decreased to at the most the said safe value.

The advantage of this embodiment is that the kinetic energy of the rotating main motor, the drive spindle and the video disc can rapidly be dissipated into heat.

The safety mechanism in accordance with the invention is critically dependent on the correct operation of the safety switch. In the event of an incorrect operation of the safety switch it may happen that after the cover has been unlatched the safety magnet is not connected to the main motor. The unlatching member can then freely return to its initial position, thus enabling the cover to be opened before the main motor has stopped. The risk of failure is minimized by the use of a safety switch as described in the Applicant's U.S. Pat. No. 4,032,971, which comprises: a stationary switching section provided with stationary switching contacts and a switching section with movable switching contacts which is movable with the aid of the cover between a playing position, in the playing position of the cover, and a safety position, in the safety position of the cover. It is nevertheless conceivable that also in the case of such a simple mechanical switch, which is generally robust and reliable, a failure might occur in that the movable switching section does not reach its safety position after unlatching of the cover. An embodiment of the invention with increased safety in this respect is characterized in that the electric safety circuit comprises an electric supply source which via switching contacts of the safety switch is connected to the safety magnet if and as long as the movable switching section of the safety switch is in the playing position.

As long as the cover is in the playing position the electric supply source continuously feeds an electric current to the safety magnet. After the unlatching member has moved to its unlatching position the safety armature is constantly attracted by the safety magnet, namely either in that the main motor is correctly connected to the safety magnet or, if the safety switch has not functioned correctly in that said supply source supplies current to the safety magnet. In such an extreme case the unlatching member can neither return to its initial position after the main motor has stopped. The cover of the video disc player then remains in its safety position and cannot be opened by a user. This is possible only after the video disc player has been switched off completely by interrupting the connection between the video disc player and the electric mains, for example by actuation of the main switch of the player.

Preferably, as already stated in the aforementioned U.S. Pat. No. 4,032,971 the main motor switch and the safety switch are combined to form one combined switch having switching contacts for the main motor supply circuit and for the safety circuit.

Figure 2:
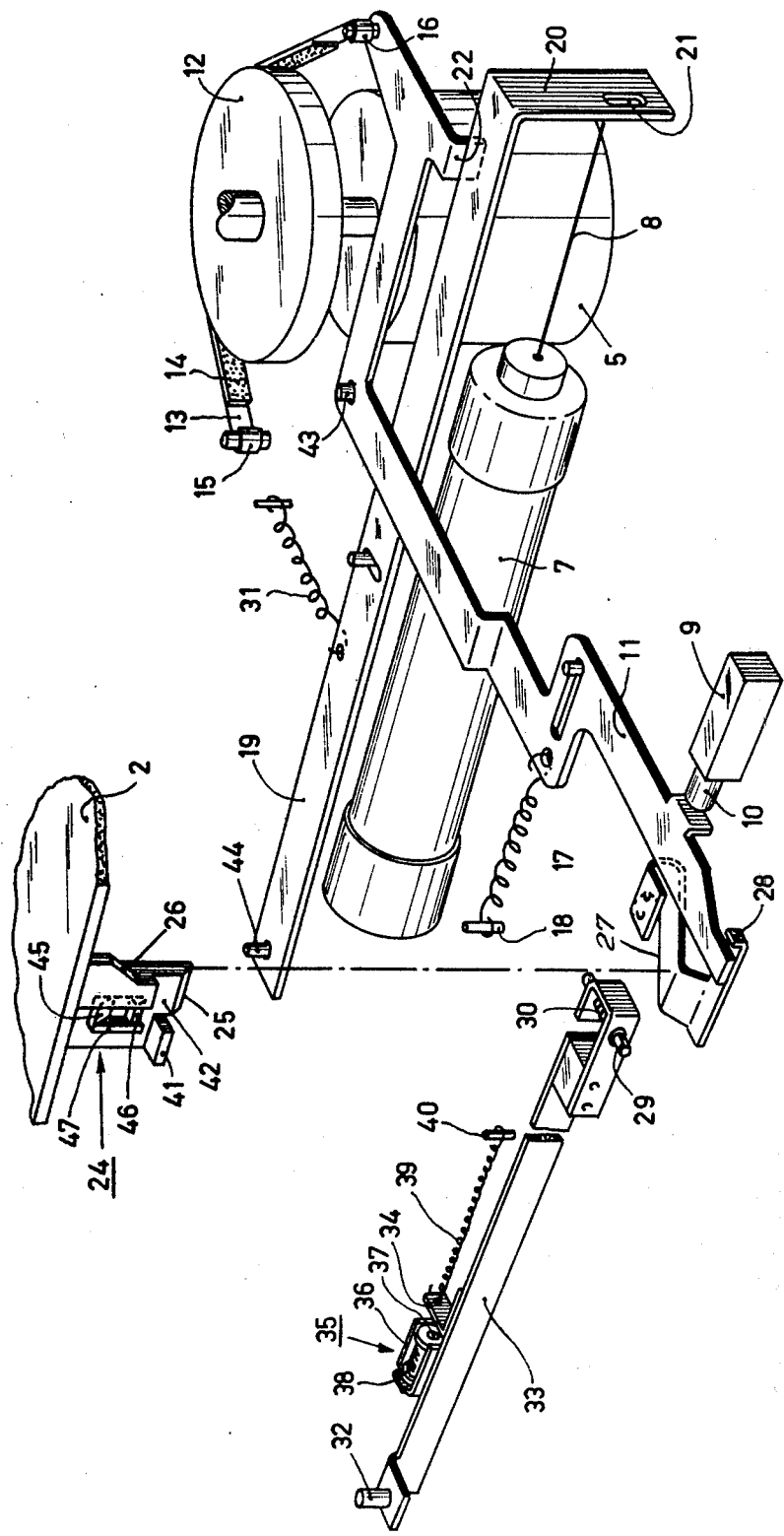

The invention will now be described in more detail with reference to the drawing, in which:

FIG. 1 shows a perspective view of a video disc player with fully opened cover, a video disc which is partly shown in cross-section being placed on the drive spindle, FIG. 2 in a perspective view and on an enlarged scale illustrates the co-operation of a number of components of the video disc player of FIG. 1 which are of importance for the invention, FIG. 3 is an elevation of a cam body which is mounted on the cover of the video disc player, I through IV denoting a number of positions which can be assumed by the cam body and thus by the cover relative to the latching means, FIG. 4 shows a plan view of braking means for braking the main motor in an embodiment of the video disc player which differs from the embodiment shown in FIG. 2, and FIG. 5 schematically shows the electric main motor supply circuit and safety circuit when a combined main motor switch and safety switch is in its playing position, and FIG. 6 again shows the diagram of FIG. 5 but now with the combined switch in its safety position.

The video disc player shown in FIG. 1 is of the type in which optical information on a video disc is read out by reflection with the aid of a laser beam. The player comprises a housing 1 on which a cover 2 is mounted which is hingeable about a pivoting axis 50. On the player a video disc 3 is placed which during playing is covered by the cover 2. In this playing position the cover is latched by latching means, to be discussed hereinafter, while unlatching is possible by means of a manual actuating member consisting of an unlatching button 4, and by means of a number of unlatching means which are also described hereinafter. In the housing a motor 5 is mounted, see FIG. 2, for rotating the video disc. This motor, hereinafter referred to as main motor, is coupled to a drive spindle 6 for the rotary support of the video disc. Furthermore, the housing 1 accommodates a radiation source in the form of a laser 7, which in FIGS. 1 and 2 is schematically represented and which may for example consist of a helium-neon laser. In FIG. 2 the beam of radiation produced by the laser is designated 8.

During unlatching the unlatching means yet to be described co-operates with a number of safety means (see FIG. 2). These means comprise:

(a) Switching means in the form of a switch 9, provided with a plurality of switching contacts, not shown, for switching on and off a power supply source, not shown, for the main motor 5. For the sake of clarity FIG. 2 neither shows the electrical connections between an electric supply source and the switch 9 and the main motor 5. The power supply to the main motor is switched on or off by actuation of the switch 9, which is provided with a push-button 10.

(b) Automatic braking means for braking and bringing the drive spindle 6 to a standstill. In the embodiment of FIG. 2 these means comprise a brake lever 11 which is pivotably connected to the housing, a brake disc 12 on the drive spindle, as well as a brake band 13 which is provided with a brake lining 14 and which at one of its ends 15 is connected to the housing and at its other end 16 to the brake lever 11. As will become evident from the description of the operation of the various safety means the brake band 13 co-operates with a part of the circumference of the brake disc 12 when the cover is open, but leaves this disc entirely free in the playing position. The brake means also included tension spring 17, which at one end is connected to the brake lever 11 and at the other end is rigidly connected to the housing via a pin 18. This spring continuously urges the brake lever towards the brake position.

(c) Switching means for causing the radiation source to extinguish, also comprising at least one switching contact on the switch 9. The electrical connections with the laser are not shown in the drawing.

(d) Shielding means which enter into the radiation path of the radiation beam 8 for shielding this radiation beam before it can emerge from the housing 1. In the embodiment of FIG. 2 said shielding means comprises a shielding lever 19 which is pivotably connected to the housing and a vane 20 which is connected to said lever and which is disposed in the radiation path of the radiation beam 8 in the shielding position of the shielding lever 11 and shields said beam, if present, but which allows said beam to pass through fully unimpeded through an opening 21 formed in the vane in the playing position of the cover. Furthermore, the shielding means include a tension spring 31 which continuously urges the shielding lever 19 in a direction towards the bent tab 22 of the brake lever 11. Thus the brake lever 11 and the shielding lever 19 are continually in contact with each other and co-operate with each other, only the brake lever 11 co-operating with the cover 2 of the video disc player in a manner yet to be discussed.

The video disc player of FIG. 1 is provided with directing means 23 for directing a read beam at information tracks of the video disc 3. These directing means comprise an objective which belongs to a focussing device. The objective is provided with a number of optical elements for focussing the light beam on the information track and with means for receiving the reflected light beam. A suitable focussing device is for example described in the Applicant's U.S. Pat. No. 4,021,101 issued May 3, 1977. This focussing device is mounted on a carriage underneath the deck 44 of the video disc player, which carriage is radially movable relative to the drive spindle. This carriage is not shown in the Figure and can be driven in its direction of movement by an electric auxiliary motor. In order to prevent the video disc player from being damaged when a video disc is removed, further safety means are provided, namely:

(e) Interrupting means, comprising at least one switching contact on the switch 9, for preventing an electric current from being applied to the said auxiliary motor.

Furthermore, in order to prevent the focussing device and in particular the objective from being damaged, there are provided (f) Interrupting means, also comprising at least one switching contact on the switch 9, for preventing an electric current from being applied to the objective motor.

Both the auxiliary motor of the carrier and the objective motor are motors which are powered via a servo-system. Thus, they are included in a control circuit. The auxiliary motor is included in a control circuit for the radial tracking of the spiral track on the video disc and the objective motor in a control circuit for following the axial movements of the disc with the objective. Removal of the video disc results in the said control circuits continuously receiving an error signal, so that the auxiliary motor will move the slide to one of its extreme positions, while the objective motor will set the objective to its highest position. Thus, the objective may be damaged, for example by manipulations with the next disc to be put on, while it is also undesirable to keep the carriage constantly in the extreme position, because the motor would constantly receive a maximum voltage during standstill.

The latching and unlatching means will now be discussed hereafter.

The latching means comprises a cam body 24 which is connected to the cover 2. Said body has a fairly complicated shape and is most clearly visible in FIGS. 2 and 3. It has a free bevelled end 25 and an at least partly oblique side face 26 which co-operates with the brake lever 11 and carries a latching cam 45, a safety cam 41 an additional latching cam 46 and an additional safety cam 47. In the playing position of the cover the brake lever 11 is pressed against the side face 26 under the influence of the tension spring 17 and is thus kept out of the braking position. In this position of the cover the cam body projects into a recess 49 in the housing and the free end 25 co-operates with a leaf spring 27. Said leaf spring is connected to the housing 1 and constantly bears against the free end 25 in the playing position. Also connected to the leaf spring 27 is a hook-shaped member 28. When the cover is open, i.e. in the situation shown in FIG. 2, the hook-shaped member 28 blocks the brake lever 11. The latching means furthermore comprise a catch in the form of a pin 29 which can be moved against the force of a pressure spring 30 in its longitudinal direction, i.e. axially.

The latching means comprise the said unlatching button 4 which in order to unlatch the cover 2 can be moved to the left by hand by the user. The button 4 co-operates with a pin 32 which is mounted on an unlatching slide 33 which also carries the pin 29.

To the unlatching slide the bracket 34 is secured, to which a tension spring 39 is attached which with its other end is connected to a pin 40 on the housing 1 and which continuously loads the bracket 34. Thus, in FIG. 2 the unlatching slide 33 is continuously pulled to the right by the tension spring 39. For unlatching the force of this spring must therefore be overcome by means of the button 4.

At the instant that the cover 2 is closed the various co-operating parts are in a position relative to each other as is shown in FIG. 2. At a given instant the end 25 of the cam body 24 comes into contact with the leaf spring 27 when the cover 2 is moved downwards. The cover is now in a position which is hereinafter referred to as its "unlatched position". In this position the end of the catch 29 which faces the cam body 24 is situated on a flat portion 42 of the cam body. A dotted line and arrows in FIG. 3 indicate the path 51 followed by the end of the catch over the cam body when the cover 2 is moved from its unlatched position to its latched position and is subsequently unlatched again. In the unlatched position of the cover the end of the catch is in a position relative to the cam body which in FIG. 3 is denoted by I. By further closing the cover against the force of the leaf spring 27, the catch 29 is moved over the additional cam 46 into an intermediate position II. In this position the cover can no longer be opened, not even by the actuation of the unlatching button 4, because the additional safety cam 47 in co-operation with the catch 29 prevents the latching slide 33 from being moved to the left.

Owing to the downward movement of the leaf spring 27, the hook-shaped member 28 is moved downwards and can no longer prevent the brake lever 11 from being rotated. This is effected by pressing the cover downwards from its intermediate position II into its latched position III against the action of the leaf spring 27. The catch then runs over the cam body 24 beyond the latching cam 45. Moreover, the oblique portion of the side face 26 moves the brake lever 11, so that the brake band 14 is disengaged from the brake disc 12 and the main motor is switched on by the main switch 9. Moreover, the servo circuits for the previously mentioned auxiliary motor and objective motor are switched on, the shielding lever 19 is moved and the laser 7 is ignited. A dangerous manipulation with the cover 2 and at the same time with the manual actuating member 4 is prevented, because the additional latching cam 46 and the additional safety cam 47 prevent the catch from following a path relative to the cam body other than that denoted by 51 in FIG. 3. Thus, unlatching of the cover is possible only after complete latching.

Unlatching of the cover from the latched position III is effected by moving the button 4 to the left by hand. As a result of this the unlatching slide 33 is also moved to the left so that the end of the catch 29 slides off the latching cam 45 and arrives at a flat portion 48. The cover 2 is pushed upwards by the leaf spring 27. However, the safety cam 41 now prevents the cover 2 from being opened further, because in the position of the unlatching slide 33 in which it has been moved to the left the catch 29 engages with the cam 41. The cover is now in its safety position (IV, FIG. 3). A safety mechanism, yet to be described, which comprises an electric safety magnet 35 and the bracket 34, which serves as safety armature, prevents the unlatching slide 33 from being moved to the right, until a specific time interval has passed. Only when the unlatching slide 33 has been slid back completely to the right can the cover 2 be opened fully again. The initial displacement of the cover 2 immediately after the actuation of the unlatching button 4, which initial displacement is equal to the distance between the top faces of the cams 45 and 41, suffices to ensure that the brake lever 11 no longer co-operates with the side face 26 of the unlatching hook 24. Immediately after the actuation of the unlatching button 4, the tension spring 17 can consequently rotate the brake lever about its hinge pin 43. Owing to this rotation the end 16 of the brake band 13 is moved over such a distance that the brake lining 14 comes into contact with the brake disc 12. However, during the movement of the brake lever 11 the button 10 of the switch 9 is also moved outwards, so that the switch contacts on the switch 9 have already changed over. The main motor 5 is consequently switched off, while simultaneously the laser beam 8 is extinguished and the auxiliary motor of the carriage as well as the objective motor of the focussing device are switched off. As an additional safety measure to prevent laser beams from emerging from the objective in the absence of a video disc and when the cover is open, the tab 22 also rotates the shielding lever 19 about its hinge pin 44 when the brake lever 11 is rotated, so that a closed portion of the vane 20 enters into the path of the laser beam 8.

The safety mechanism which prevents the unlatching member 33 from returning from its unlatched position to its initial position during the time interval which is required to reduce the speed of rotation of the drive spindle to a non-hazardous safe value comprises the electric safety magnet 35 and the safety armature 34 which together with the unlatching member 33 is movable relative to said magnet. Furthermore, it includes an electric safety circuit which is discussed with reference to FIGS. 5 and 6. In these Figures a switch 91 is shown schematically, which differs from the switch 9 of FIG. 2 in that the present switch merely comprises a number of switching contacts required for the safety circuit and for an electric braking circuit which co-operates with braking means in accordance with FIG. 4. These braking means are a modification of the braking means shown in FIG. 2, although they can co-operate with the same brake disc 12. The switch 91 is consequently a combination of a main motor switch, a safety switch and a brake switch. A number of stationary switching contacts 52 through 58 co-operate with a number of movable switching contacts 59 through 63 on the switch button 101. All stationary switching contacts are insulated from each other. The movable switching contacts 59 and 60 are interconnected to each other, which also applies to the movable switching contacts 61 through 63. These two groups of interconnected movable switching contacts are insulated from each other. The push-button 101 is loaded to the left in the FIGS. 5 and 6 by a pressure spring 65 which is situated in the housing 64 of the switch, which pressure spring is capable of moving the push-button 101 so far to the left that a stop 66 on the push-button is pressed against a side face of the housing 64.

The main-motor supply circuit for powering the main motor 5 comprises a power supply source 67. This source is connected to the stationary switching contact 58 by means of an electric conductor 68. The electric safety circuit comprises electric conductors 69 and 70 by means of which the safety magnet 35 is connected to the stationary switching contact 55 of the switch 91.

In FIG. 5 the switch 91 is in its playing position. The push-button 101 is pressed to the right by a component 71 which is connected to the cover. It is important that the push-button 101 is not pressed to the right until the catch 29 has moved to a position above the additional latching cam 46, but not yet above the latching cam 45. In other words: the push-button 101 should be moved to the right when the cover moves from its intermediate position II to its latched position III. Via the interconnected movable switching contacts 61 and 63 the power supply source 67 and the motor 8 are now connected to each other, so that the supply current flows to the motor and causes said motor to rotate.

When the cover is open, see FIG. 6, the switch 91 is in its safety position, in which the movable switching contacts 61 and 63 connect the stationary switching contacts 57 and 55 to each other. The stationary switching contacts 57 and 58 are now no longer connected to each other, so that the supply current can no longer reach the main motor 5. In this situation the main motor functions as a generator and the generated current is applied to the safety magnet 35 via the electric conductors 69, 72 and 70. When the cover is open the safety armature 34 with the unlatching slide 33 has been moved so far to the left that it butts against the core of the safety magnet 35 and is magnetically attracted thereby. After the manual actuating member 4 has been released the unlatching member 33 cannot be returned from its unlatched position to its initial position by the tension spring 39 as long as the safety armature 34 is attracted by the safety magnet 35 with a force greater than the tensile force of the spring 39. In the mean time the main motor 5 is braked so that the generated current decreases. When the speed of the main motor has decreased to approximately 100 revolutions per minute the force of attraction between the safety magnet 35 and the safety armature 34 has decreased so far that the spring 39 returns the unlatching member 33 to its initial position.

The main motor is braked with the aid of braking means shown in FIG. 4 and also in FIGS. 5 and 6. These means comprise a movably mounted braking-force transmission member in the form of a brake lever 73, which is rotatable about a hinge pin 64. At one end of the brake lever 73 a brake shoe 76 is situated which is pivotable to a limited extent about a pin 75 which brake shoe has a brake lining 77. The brake shoe 76 is movable relative to the brake disc 12 between a braking position, see FIG. 6, in which it frictionally co-operates with the brake disc, and a disengaged position, see FIG. 4 and FIG. 5, in which it leaves the brake disc completely free. The braking means are energized with the aid of a stationary electric brake magnet 78 in which a brake armature 79 is electromagnetically movable by the brake magnet. Said brake armature is connected to the brake lever 73 via a connecting plate 80. When the brake magnet 78 is energized the brake armature 79 is pulled into the brake magnet 78, so that the brake lever 73 pivots about the pivoting pin 74 and the brake shoe 76 is pressed against the brake disc 12. Upon denergization of the brake magnet 78 the brake lever is returned to its disengaged position with the aid of the tension spring 81. As is shown in FIGS. 5 and 6 the brake magnet 78 is connected to a stationary switching contact 56 of the combined switch 91 with the aid of an electric conductor 82. As long as the cover is in its playing position (FIG. 5) and the switch 91 is thus also in its playing position, the stationary switching contact 56 is completely disconnected and consequently no current is fed to the brake magnet 78. The brake shoe 76 is consequently in its disengaged position and does not co-operate with the brake disc 12. When the cover is open and the switch 91 is consequently in the safety position (see FIG. 6) the stationary switching contact 56 is electrically connected to the main motor 5 via the interconnected movable switching contacts 62 and 63 and the electrical conductor 69, so that the brake magnet 78 as well as the safety magnet 35 are energized by the current generated by the main motor 5. Thus, the main motor is braked by the load which is constituted by the two magnets 35 and 78 and by the friction which is exerted on the brake disc 12 by the brake shoe 76. This ensures fast and effective braking of the main motor.

It is evident that when braking means of the type shown in FIG. 4 are used the main motor will not be braked if the switch 91 fails to operate, so that the button 101 is not moved from its playing position to its safety position by the pressure spring 65. In order to prevent the occurrence of a hazardous situation in the event of such a failure, also when braking means of the type shown in FIG. 2 are used, the electric safety circuit includes an electric power supply source 83, which viaan electric conductor 84 is connected to a stationary switching contact 53 of the switch 91. If the switch 91 is in its playing position (FIG. 5), the stationary switching contact 53 is electrically interconnected to the stationary switching contact 52 via the movable interconnected switching contacts 59 and 60. The switching contact 52 is connected to the electric conductor 70 via an electric conductor 85. The safety magnet 35 consequently receives a supply current from the power supply source 83. However, owing to the distance between the core 37 of the safety magnet 35 and the safety armature 34 the safety magnet cannot actuate the safety armature and thus the unlatching member 33. When the unlatching member 33 is actuated with the aid of the manual actuating member 4 the safety armature 34 is moved against the core 37 of the safety magnet 35, so that if the switch button 101 remains in the position shown in FIG. 5 the safety armature 34 remains attracted by the safety magnet 35 and the cover cannot be opened. The cover cannot be opened until the video disc player has been switched off completely by interrupting the electrical connection to the electric mains. As a result of this, the power supply source 83 is also switched off, so that the safety magnet 35 releases the brake armature 34, thus enabling the unlatching member 33 to move to its initial position.

What is claimed is:
1. Apparatus for enclosing a rotating disc, comprising a housing,
spindle means in said housing for supporting said disc,
spindle motor means in said housing for rotating said spindle,
a cover pivotally mounted on said housing and displaceable to a fully open position, a fully closed position and a safety position intermediate said fully opened and fully closed positions,
controllable voltage supply means for selectively providing electrical power to said spindle motor means,
cam operated switch means for causing the electrical power from said voltate supply means to energize said motor means in response to the movement of the cover to its fully closed position and for stop- ping the energizing of said motor means in response to the movement of the cover to its safety position and the fully closed position, braking means for reducing the speed of the motor means in response to the movement of said cover to its safety position, electromagnetic safety means actuable by electrical current therethrough for preventing the cover from being released from said safety position to said fully open position, and safety circuit means for connecting said electromagnetic safety means to said motor means in response to the movement of said cover to its safety position, said motor means further comprising means for inductively generating electrical current in response to rotation of said motor in the absence of electrical power from said voltage supply means, whereby said electromagnetic safety means is actuated to prevent the cover from being released from the safety position until the speed of the motor has decreased to a predetermined rotational speed.

2. Apparatus as recited in claim 1, wherein said braking means comprises a pair of friction member means actuable to engaged and disengaged positions for reducing the speed of the motor means when in the engaged position, resilient means for biassing said friction member means towards said disengaged position, and electromagnetic brake actuating means responsive to the movement of said cover to its safety position and to said current inductively generated by said motor means for actuating said friction member means to said engaged position, whereby said braking means reduces the speed of the motor toward said predetermined speed when said cover is moved to the safety position.

3. Apparatus as recited in claim 1, wherein said safety circuit means comprises a safety switch having movable contacts and stationary contacts actuable by said cover for connecting said motor means to said electromagnetic safety means through said movable and stationary contacts of said safety switch.

* * * * *